United States Patent
Cherukuri et al.

(10) Patent No.: US 7,362,739 B2
(45) Date of Patent: Apr. 22, 2008

(54) METHODS AND APPARATUSES FOR DETECTING CLOCK FAILURE AND ESTABLISHING AN ALTERNATE CLOCK LANE

(75) Inventors: Naveen Cherukuri, San Jose, CA (US); Tim Frodsham, Portland, OR (US); Eduard Roytman, Brookline, MA (US); Sanjay Dabral, Palo Alto, CA (US); Rahul Shah, Marlborough, MA (US); Theodore Z. Schoenborn, Portland, OR (US); Maurice B. Steinman, Marlborough, MA (US); David S. Dunning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 10/874,511

(22) Filed: Jun. 22, 2004

(65) Prior Publication Data

US 2005/0281203 A1    Dec. 22, 2005

(51) Int. Cl.
*H04B 7/216* (2006.01)

(52) U.S. Cl. .................................................... 370/342
(58) Field of Classification Search ................ 713/310; 375/354; 370/216
See application file for complete search history.

(56) References Cited

U.S. PATENT DOCUMENTS

| 6,446,215 B1* | 9/2002 | Meyer et al. ............... 713/310 |
| 6,754,171 B1* | 6/2004 | Bernier et al. .............. 370/216 |
| 6,859,106 B2* | 2/2005 | Sano .......................... 331/1 A |
| 7,065,169 B2* | 6/2006 | Hartwell ..................... 375/354 |
| 2005/0188232 A1* | 8/2005 | Weng et al. ................ 713/320 |

* cited by examiner

*Primary Examiner*—Duc M. Nguyen
*Assistant Examiner*—Wayne Cai
(74) *Attorney, Agent, or Firm*—Blakely, Sokoloff, Taylor & Zafman LLP

(57) ABSTRACT

Methods and apparatuses for determining clock failure for a multi-agent system employing a link-based interconnection scheme using a forwarded clock. For one embodiment of the invention, the cessation of the forwarded clock initiates a clock failure determination process. For one embodiment of the invention, upon a determination of clock failure, an alternate clock lane is implemented using a pre-designated data lane.

30 Claims, 3 Drawing Sheets

METHODS AND APPARATUSES FOR DETECTING CLOCK FAILURE AND ESTABLISHING AN ALTERNATE CLOCK LANE

FIELD

Embodiments of the invention relate generally to the field of processing systems employing a link-based interconnection scheme, and more specifically to methods for detecting clock failure and establishing an alternate clock lane.

BACKGROUND

To address the disadvantages of bus-based interconnection schemes for multiple-processor systems (MPSs), point-to-point, link-based interconnection schemes have been developed. Each node of such a system includes an agent (e.g., processor, memory controller, I/O hub component, chipsets, etc.) and a router for communicating data between connected nodes. The agents of such systems communicate data through use of an interconnection hierarchy that typically includes a protocol layer, an optional routing layer, a link layer, and a physical layer.

The protocol layer, which is the highest layer of the interconnection hierarchy, institutes the interconnection protocol, which is a set of rules that determines how agents will communicate with one another. For example, the interconnection protocol sets the format for the protocol transaction packet (PTP), which constitutes the unit of data that is communicated between nodes. Such packets typically contain information to identify the packet and indicate its purpose (e.g., whether it is communicating data in response to a request or requesting data from another node).

The routing layer determines a path over which data is communicated between nodes. That is, because each node is not connected to every other node, there are multiple paths over which data may be communicated between two particular nodes. The function of the routing layer is to specify the optimal path.

The link layer receives the PTPs from the protocol layer and communicates them in a sequence of flits. The link layer handles the flow control, which may include error checking and encoding mechanisms. Through the link layer, each node is keeping track of data sent and received and sending and receiving acknowledgements in regard to such data.

The physical layer consists of the actual electronics and signaling mechanisms at each node. In point-to-point, link-based interconnection schemes, there are only two agents connected to each link. This limited electronic loading results in increased operating speeds.

The interconnection hierarchy is implemented to achieve greater system operating speed at the physical layer. The link layer is transmitting data (received as PTPs from the protocol layer) in flits, which are then decomposed into phits at the physical layer and are communicated over the physical layer interconnect (PLI) to the physical layer of a receiving agent. The received phits are integrated into flits at the physical layer of the receiving agent and forwarded to the link layer of the receiving agent, which combines the flits into PTPs and forwards the PTPs to the protocol layer of the receiving agent.

The electronics of the physical layer typically include some training logic that allows the physical layer of each node of a link to operate using the link. That is, the training logic allows the physical layers to calibrate their internal integrated circuit devices so that they are compatible with the link (i.e., the physical interconnect). This process is known as physical layer link initialization.

After initialization, or in some instances during the initialization, it may become necessary to reset the physical layers on two interconnected agents. In typical systems, agents have a fixed hierarchy and an agent at the higher level resets an agent at a lower level using a specific set of signals. Such a physical layer reset scheme impacts higher layers of the link.

Recent innovations allow a system that employs a forwarded clock signal to effect a reset of the physical layer in response to cessation of the forwarded clock signal. Such systems will reset upon cessation of the forwarded clock, but have no mechanisms to determine the cause of the cessation. When the forwarded clock is intentionally stopped by one of the interconnected agents, then advancing to a reset state is desirable. However, if the forwarded clock is stopped due to a malfunctioning clock, then re-initialization will be ineffective.

BRIEF DESCRIPTION OF THE DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Physical Layer Initialization

A portion of the PLI logic is used to effect link training or calibration. The training logic allows the physical layer on each side of the link to be calibrated in order to begin using the link. That is, the internal semiconductor devices are calibrated to be compatible with the I/O link of the PLI. The initial calibration procedure is referred to as initialization of the physical layer. This initialization is effected in a sequence of stages with the initialization of each subsequent stage requiring the training of I/O circuitry in a previous stage.

Figure 1:
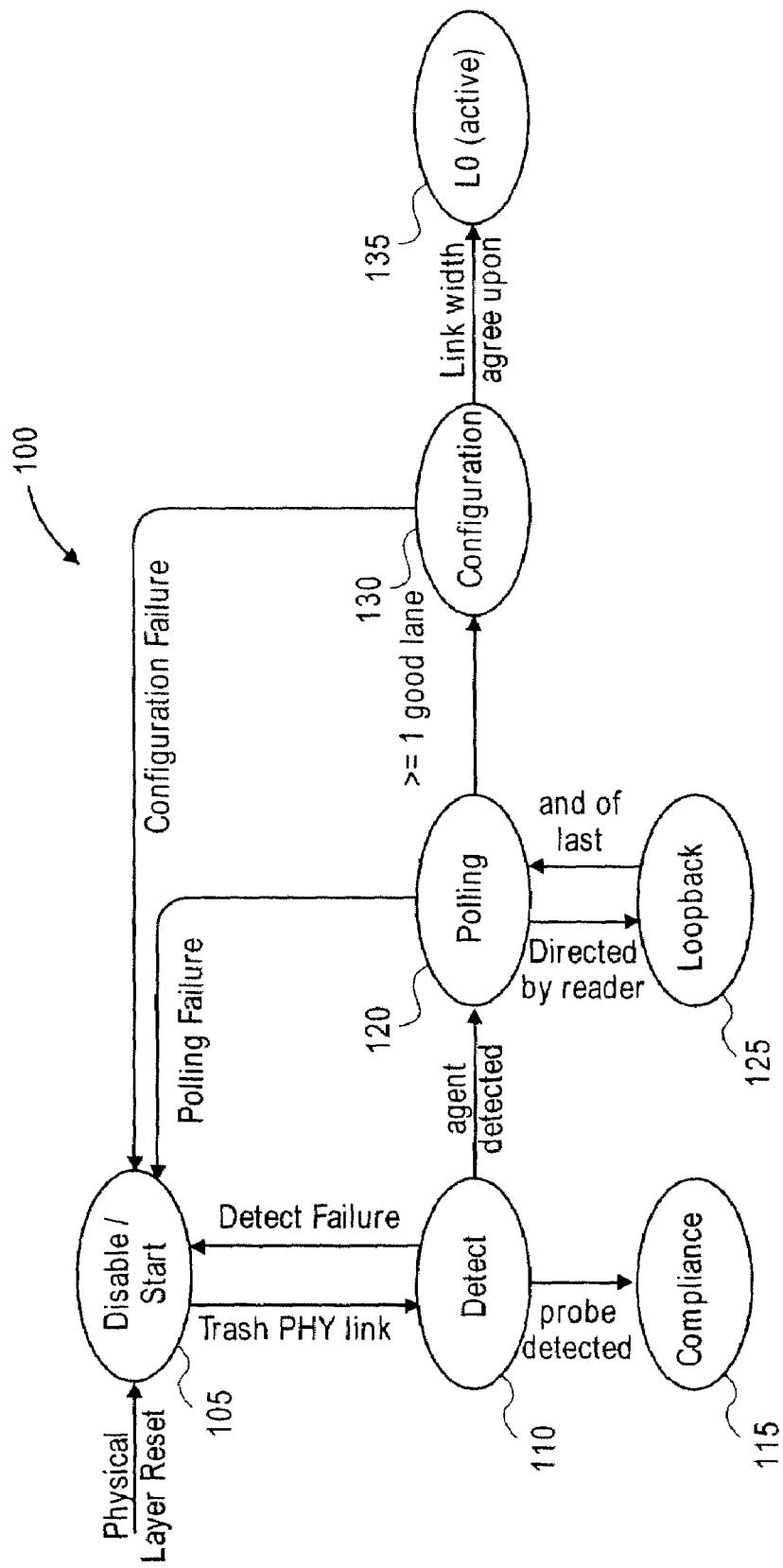
FIG. 1 illustrates a state machine for effecting a physical layer initialization of a link in which the physical layer is reset using in-band reset in accordance with one embodiment of the invention.

FIG. 1 illustrates a state machine for effecting a physical layer initialization of a link in which the physical layer is reset using in-band reset in accordance with one embodiment of the invention. State machine 100, shown in FIG. 1, represents an initialization sequence starting with Disable/Start operation 105. The Disable/Start state 105 is entered at power-on or in response to any physical layer reset event. Upon starting, the PLI performs a Detect operation 110 to detect an interconnected agent. The Detect operation 110 is the point at which two agents are synchronized to commence link initialization. The Detect operation 110 determines if there is another physical layer agent (i.e., the physical layer of another agent) at the other end of the link. Alternative embodiments of the invention provide a PLI that can distinguish between detection of an interconnected agent and a test probe.

In Detect operation 110, the local port activates a forwarded clock and begins locking to the received clock from the remote port. If at the end of some specified time, the received clock is not detected, the local port abandons the initialization sequence and resets to operation Disable/Start 105.

Upon detecting each other, the interconnected agents begin a Polling operation 120 to effect interactive training. During Polling operation 120, the link is trained to operate with the high-speed clock used to select between the two interconnected agents. During the Polling operation 120, information regarding disabled lanes is exchanged between the two agents.

Upon completion of the Polling operation 120, a Configuration operation 130 is performed. During Configuration operation 130, information acquired during polling is used to configure the link. There may be a situation in which some of the lanes of a link are disabled. This may be due to faulty lanes or as a part of a power saving scheme or the lanes may be used as alternate clock lanes as described below. During configuration, all of the information regarding disabled lanes that was acquired during polling is used to configure the link into viable quadrants in order to keep the link functioning even if at reduced efficiency. The total lanes of the link are divided into quadrants. For example, a 20-lane link may be divided into quadrants of 5 lanes each. The physical layer can then be operated using any combination of quadrants. For one embodiment of the invention, the physical layer is operated using any one quadrant, any combination of two quadrants, or all quadrants.

In accordance with one embodiment of the invention the lanes of a link are divided into quadrants and viable quadrants are determined. For example, a 20-lane link is divided into quadrants of 5 lanes each. If any lane of a quadrant is disabled, that quadrant is not viable and will not used. The Rx then determines its ability based upon viable quadrants and creates a prioritized list of quadrant combinations that it can operate with and transmits this list to the Tx.

The Tx selects a quadrant combination and establishes a reduced-width link. This allows the system to continue to function in a degraded mode as opposed to shutting down and allows quick transition to a reduced-width (e.g., half-width or quarter-width) link.

Upon completion of the Configuration operation 130, the link initialization is complete and the link layer takes control of the port at state L0 135, unless the local and remote ports cannot agree on a link configuration in which case the initialization sequence is abandoned and reset to operation Disable/Start 105.

Upon successful completion of the Configuration operation 130, the physical layer electronics are still active, but engaged in decomposing the flits on one side of the link and reconstructing them on the other side of the link. The physical layer is no longer involved in training and operates under the direction of the link layer in state L0 to transfer data across the link.

In-band Reset

As discussed above, in reference to FIG. 1, a forwarded clock is sent, during the Detect operation 110, by the local agent, which then awaits a received clock from the remote port. A forwarded clock is an explicit clock signal transmitted, along with the outgoing data on the physical interconnect, using dedicated clock pins. The forwarded clock is sent during the Detect operation 110 and continues indefinitely. The forwarded clock allows each agent to know what clock signal they should use to receive data from the other. In accordance with one embodiment of the invention, an in-band reset (IBR) is initiated by cessation of the forwarded clock. An IBR is used by the link layer to re-initialize the physical layer if the physical layer cannot recover from CRC errors beyond a specified retry threshold. An IBR is also used to configure the physical layer by overriding power-on default values through soft reset. Additionally, the IBR can be used in response to a failure during the initialization of the physical layer to force the two interconnected agents to re-initialize the link. IBR may be used for additional or alternative purposes in other embodiments of the invention.

The culmination of the IBR process in accordance with one embodiment of the invention is that both interconnected agents return to the Detect operation 110, through the Disable/Start operation 105 of the initialization process, to attempt a re-initialization.

Determining Clock Failure

As discussed above, in accordance with one embodiment of the invention, an agent proceeding to a reset state is an indication of forward clock cessation. However, the reset does not indicate the cause of cessation. That is, the reset itself, does not differentiate between a clock failure and an intentional cessation of the clock to effect a desired re-initialization.

As discussed in more detail below, in accordance with one embodiment of the invention, one or more of the data lanes are designated as alternate clock lanes to be used in the event of a clock failure. For one embodiment of the invention, two lanes are designated as a first alternate clock lane (Alt Clk1) and a second alternate clock lane (Alt Clk2), respectively, with Alt Clk2 used in the event of a failure on the primary clock lane and on Alt Clk1. For such an embodiment, the two lanes designated as alternate clock lanes may be selected from different quadrants.

Figure 2:
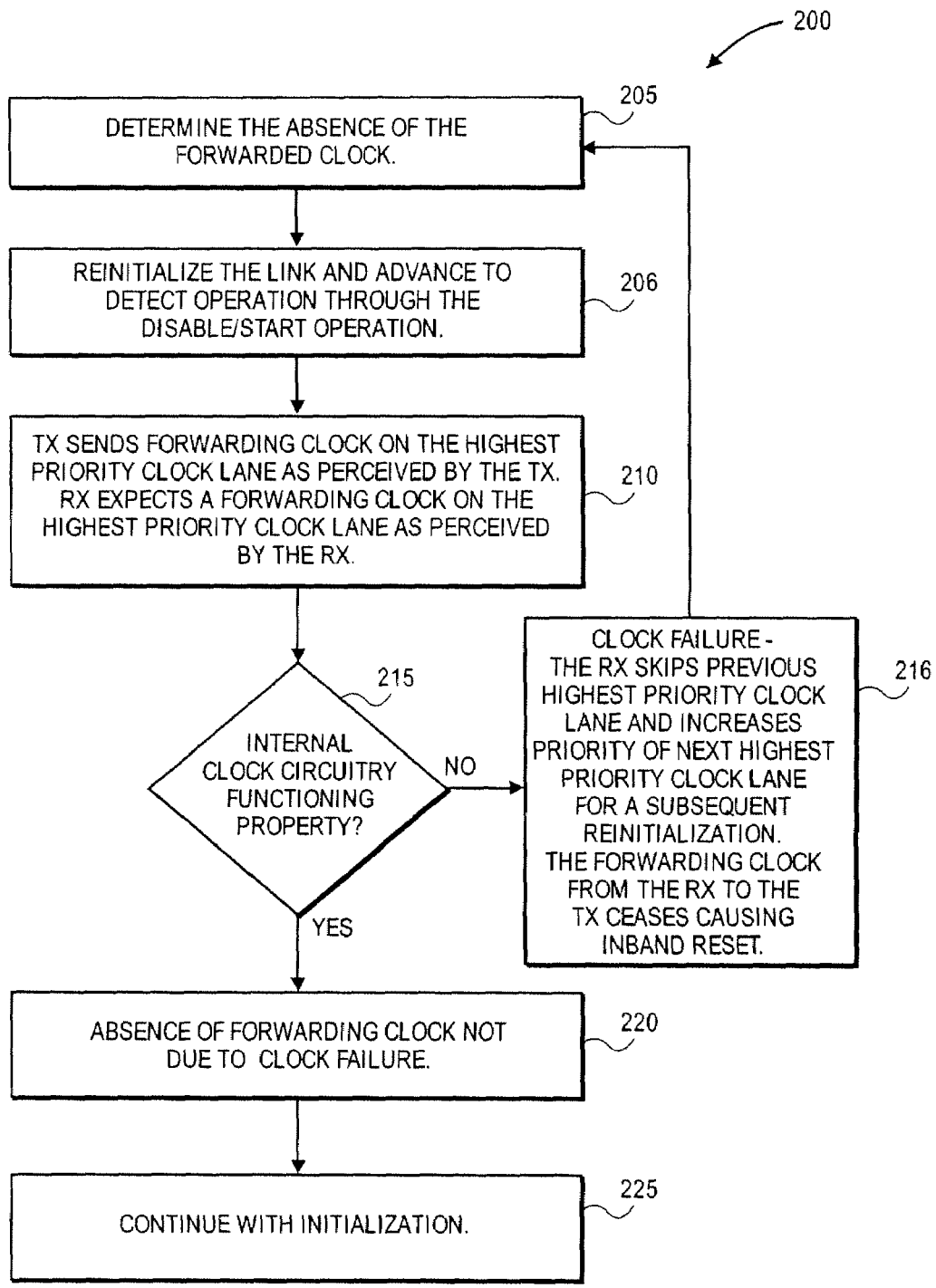
FIG. 2 illustrates a process in which clock failure is determined in accordance with one embodiment of the invention.

FIG. 2 illustrates a process in which clock failure is determined in accordance with one embodiment of the invention. Process 200, shown in FIG. 2, begins with operation 205 in which it is determined that the forwarded clock is absent. For example, an IBR has occurred indicating cessation of the forwarded clock.

At operation 206 a reinitialization of the link is commenced and the process advances to the Detect operation 110 through the Disable/Start operation 105.

At operation 210, the Tx sends a forwarded clock on the highest priority lane as perceived by the Tx. The Rx expects a forwarded clock on the highest priority lane as perceived by the Rx. That is, when the Rx is ready to receive a forwarded clock it will set the impedance to low on the primary and all alternate clock lanes. The Tx checks the primary and alternate clock lanes. If the Tx perceives low impedance on at least one clock lane, the Tx selects the highest priority clock lane (from the perspective of the Tx) from among those with low termination impedance and drives a forwarded clock on that lane. The Tx also sets a timer allocating a specified time for the Rx to receive the forwarded clock.

If the Tx perceives a high impedance on all clock lanes (i.e., primary and alternates), the Tx assumes that the Rx is not ready to receive the forwarded clock. However, if the Rx impedance is set to low then the Rx expects a forwarded clock within a specified time. If the forwarded clock is not received within that time, the Rx node sends an IBR to the Tx node.

At operation 215, the internal clock circuitry is checked to determine if it is functioning properly, if not, a clock failure is determined at operation 216. Upon a subsequent reinitialization, the Rx is aware that the primary clock lane has failed and will not set the impedance low for this lane. The Rx then considers the previously second-highest priority lane as the highest priority lane for the subsequent reinitialization. At this point the forwarded clock from the Rx node to the Tx node has ceased, causing an IBR. The process is continued at operation 205 in which the absence of a forwarded clock is determined.

If, at operation 215, the internal clock circuitry is functioning properly (e.g., the data lane terminations go from high to low within the allocated time, this means the Rx has recognized the forwarded clock from the Tx and the internal clock circuitry is functioning properly) then a determination is made that the absence of the forwarded clock is not due to a clock failure at operation 220. For example, it may be determined that the absence of the forwarded clock is due to an intentional IBR.

At operation 225 the initialization process is continued.

Alternate Clock Lanes

As noted above, in accordance with one embodiment of the invention, one or more of the data lanes are designated as alternate clock lanes to be used in the event of a clock failure.

Figure 3:
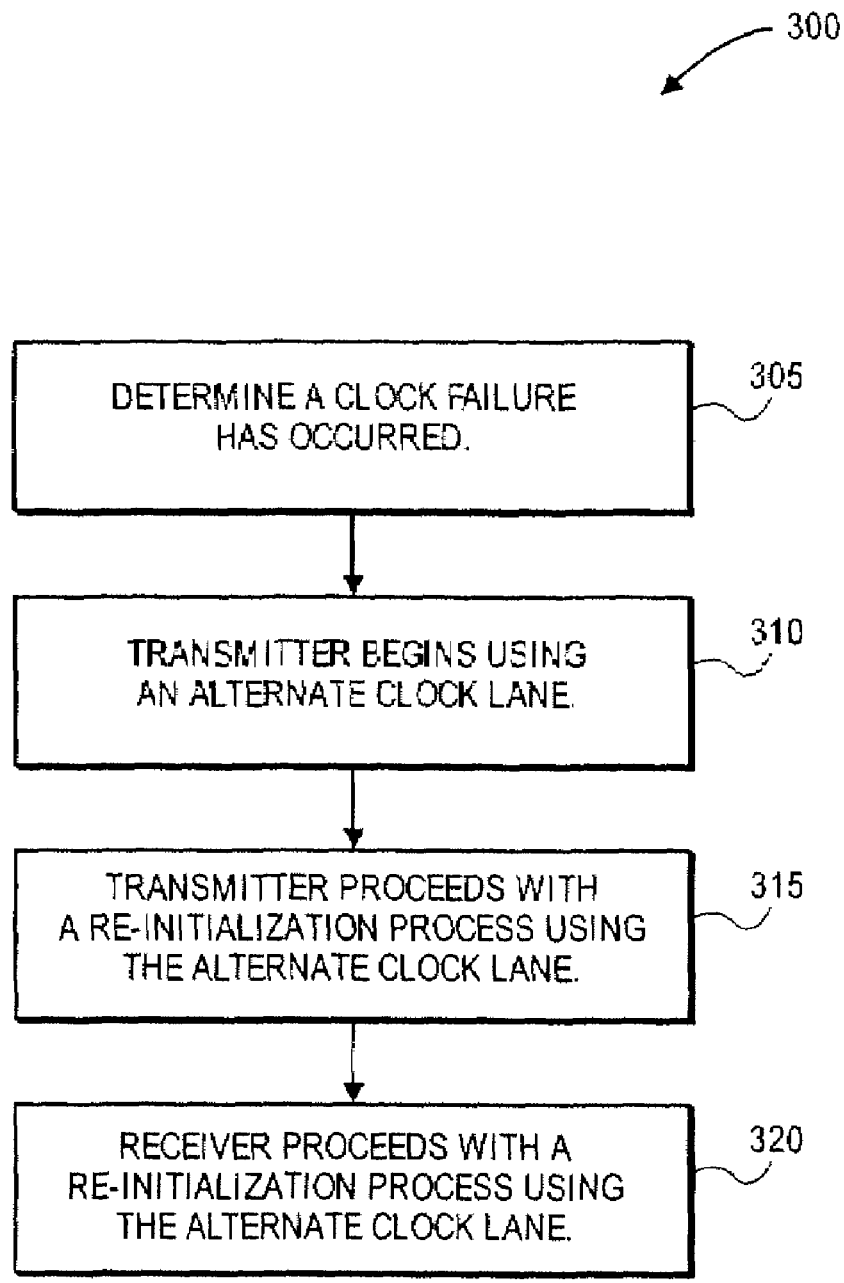
FIG. 3 illustrates a process by which two interconnected agents having at least one pre-designated alternate clock lane implement an alternate clock lane in the event of a clock failure in accordance with one embodiment of the invention.

FIG. 3 illustrates a process by which two interconnected agents having at least one pre-designated alternate clock lane implement an alternate clock lane in the event of a clock failure in accordance with one embodiment of the invention. Process 300, shown in FIG. 3, begins at operation 305 in which a clock failure is determined. For example, a clock failure may be determined in accordance with process 200, described above in reference to FIG. 2, for one embodiment of the invention.

At operation 310, the Tx begins driving the clock signal on Alt Clk1. The signal is driven for a specified time. At this point, the Rx continues to expect the clock signal on the primary clock lane because the Rx is not aware of the clock failure and has not been trained to respond to input on Alt Clk1.

At operation 315, the Tx proceeds with an IBR. That is, the Tx waits the specified time to receive acknowledgement from the Rx that the clock signal has been received. The acknowledgement is not forthcoming as the Rx did not receive the clock signal. The Tx, therefore, proceeds to a reset state, Disable/Start state 105, and then to the Detect operation 110. Alternatively the Rx could have initiated an IBR having not received the forwarded clock within the specified time. This would then force the Tx to proceed to Disable/Start and begin a reinitialization process.

At operation 320, the Rx proceeds with an IBR, but checks for the forwarded clock from the Tx on the Alt Clk1 channel during the Detect operation 110 of the re-initialization process. That is, the Rx having waited a specified period of time for a clock signal from the Tx in Detect operation 110 of the previous initialization process, proceeds with an IBR. The Rx realizes that the clock signal was not forthcoming from the Tx during the previous initialization on the primary clock lane. The Rx, therefore, implements Alt Clk1 as the primary clock lane.

At this point the Rx is aware that Alt Clk1 is now the primary clock lane. The data lane designated as the Alt Clk1 lane can no longer be used for data, and therefore, the Tx and the Rx disable the quadrant containing the Alt Clk1 lane. The Tx and the Rx proceed through a complete initialization process (i.e., re-initialization process), as described above, in reference to process 100 of FIG. 1, in order to exchange information including configuration information specifying link-width and quadrant combinations. If Alt Clk1 is functioning properly, a half-width link will be initialized using two of the three quadrants not containing Alt Clk1.

For an embodiment of the invention in which multiple alternate clock lanes are designated, process 300 is reiterated during the re-initialization process using the alternate clock lane as the primary clock lane. For example, when the primary clock lane malfunctions, the Tx and Rx attempt to initialize the link using Alt Clk1 (with Alt Clk1 acting as the primary clock lane). If Alt Clk1 also malfunctions, Alt Clk2 is then used as the alternate clock lane during a subsequent re-initialization. For such an embodiment, Alt Clk1 and Alt Clk2 are designated data lanes in different quadrants to improve reliability. A half-width link can then be initialized using the two quadrants that do not contain Alt Clk1 or Alt Clk2.

General Matters

Embodiments of the invention provide methods for detecting the failure of a clock lane. Various alternative embodiments of the invention provide methods for establishing an alternate clock lane. For one such embodiment of the invention, the Rx restarts the initialization process upon determination that the primary clock lane has failed.

Examples discussed above involve a situation where the Tx and Rx have a different perspective of highest priority clock lane. In accordance with various alternative embodiments, there could be cases where both the Tx highest priority clock lane and the Rx highest priority clock lane are the same. In such cases there could be failure on the clock even where both Tx and Rx perceive a low impedance (e.g., if the Tx circuits that drive the clock lane malfunction).

In an alternative embodiment of the invention, the Rx does not proceed with a re-initialization when the clock signal is not perceived on the primary clock lane. Instead, the Rx begins looking for the clock signal on a pre-designated alternate clock lane. Such an embodiment would save time (e.g., the time of proceeding through the re-initialization process), but would require that a separate DLL be implemented for each alternate clock lane.

The states and operations of the invention may be effected by hardware components or may be embodied in machine-executable instructions as described above. Alternatively, they may be performed by a combination of hardware and software. The invention may be provided as a computer program product that may include a machine-accessible medium having stored thereon instructions, which may be used to program a computer (or other electronic devices) to perform a process according to the invention as described above.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   determining that a forwarded clock has ceased, the forwarded clock transmitted from a first agent to a second agent, the first agent and the second agent interconnected through a link-based interconnection scheme;
   evaluating a clock lane between the first agent and the second agent;
   determining a clock failure if the clock lane between the first agent and the second agent is malfunctioning; and
   evaluating an internal clock circuitry if the clock lane between the first agent and the second agent is functioning properly.

2. The method of claim 1 further comprising:
   determining the clock failure if the internal clock circuitry is malfunctioning.

3. The method of claim 2 wherein the two agents are components selected from the group consisting of a processor, a memory controller, an input/output hub component, a chipset, and combinations thereof.

4. The method of claim 3 wherein evaluating a clock lane between the first agent and the second agent includes determining if a specified impedance is present at a termination of the clock lane at the second agent.

5. The method of claim 4 wherein evaluating an internal clock circuitry includes determining if one or more data lane termination impedances change from a first expected value to a second expected value.

6. The method of claim 3 wherein a clock failure has been determined further comprising:
   driving a clock signal on a selected one of one or more alternate clock lanes; and
   re-initializing a physical layer connection between the first agent and the second agent wherein the selected alternate clock lane is used to transmit a clock signal.

7. The method of claim 6 wherein each of the one or more alternate clock lanes is a pre-designated data lane.

8. The method of claim 7 wherein each pre-designated data lane is selected from a different data lane division of a plurality of data lane divisions.

9. The method of claim 8 wherein the data lane divisions are data lane quadrants.

10. The method of claim 3 wherein a clock failure has been determined further comprising:
    a transmitter driving a clock signal on a selected one of one or more alternate clock lanes; and
    a receiver looking for the clock signal on the selected alternate clock lane.

11. A system comprising:
    a plurality of agents interconnected through a point-to-point link-based interconnection scheme wherein a first agent determines a clock failure by determining that a forwarded clock has ceased and determining that a specified impedance is present at a termination of a clock lane at a second agent, wherein determination of the clock failure is effected by determining that the forwarded clock from the first agent to the second agent has ceased, evaluating the clock lane, and determining the clock failure if the clock lane is malfunctioning, and if the clock lane is not malfunctioning, evaluating an internal clock circuitry.

12. The system of claim 11 wherein the cessation of the forwarded clock signal causes a second agent, interconnected to the first agent, to cease a forwarded clock transmission and data lane transmission from the second agent to the first agent, and advance to a reset state.

13. The system of claim 12 wherein the cessation of the forwarded clock transmission from the second agent to the first agent causes the first agent to advance to a reset state.

14. The system of claim 13 wherein a re-initialization of a physical layer link between the first agent and the second agent is attempted with a clock signal from the first agent transmitted over a data lane.

15. A system comprising:
    a transmitting agent having a plurality of data transmission lanes and at least one clock lane wherein one or more of the data transmission lanes is designated as an alternate clock lane such that upon a determination of a clock lane failure, a clock signal is transmitted over a first of the one or more alternate clock lanes; and
    a receiving agent interconnected to the transmitting agent, wherein determination of the clock lane failure is effected by determining that a forwarded clock from the transmitting agent to the receiving agent has ceased, evaluating the at least one clock lane, and determining the clock lane failure if the at least one clock lane is malfunctioning, and if the at least one clock lane is not malfunctioning, evaluating an internal clock circuitry.

16. The system of claim 15 wherein the transmitting agent is interconnected to the receiving agent through a point-to-point link-based interconnection scheme.

17. The system of claim 16 wherein the transmitting agent and the receiving agent are components selected from the group consisting of a processor, a memory controller, an input/output hub component, a chipset, and combinations thereof.

18. The system of claim 15 wherein determination of a clock lane failure occurs if the internal clock circuitry is malfunctioning.

19. The system of claim 18 wherein evaluating the at least one clock lane includes determining if a specified impedance is present at a termination of a clock lane at the receiving agent.

20. The system of claim 19 wherein evaluating an internal clock circuitry includes determining if one or more data lane termination impedances change from a first expected value to a second expected value.

21. The system of claim 20 wherein the plurality of data transmission lanes are divided into data transmission lane divisions and each of the one or more data transmission lanes designated as an alternate clock lane is selected from a different data transmission lane division.

22. A computer readable medium encoded with computer executable instructions, which when executed by a machine, cause the machine to perform operations comprising:
   determining that a forwarded clock from a transmitting agent to a receiving agent has ceased, the transmitting agent interconnected to the receiving agent through a point-to-point link-based interconnection scheme;
   evaluating a clock lane between the transmitting agent and the receiving agent;
   determining a clock failure if the clock lane is malfunctioning; and
   evaluating an internal clock circuitry if the clock lane between the transmitting agent and the receiving agent is functioning properly.

23. The computer readable medium of claim 22, being further encoded with computer executable instructions, which when executed by a machine, cause the machine to perform further operations comprising:
   determining the clock failure if the internal clock circuitry is malfunctioning.

24. The computer readable medium of claim 23, wherein evaluating a clock lane between the transmitting agent and the receiving agent includes determining if a specified impedance is present at a termination of the clock lane at the second agent.

25. The computer readable medium of claim 24 wherein evaluating an internal clock circuitry includes determining if one or more data lane termination impedances change from a first expected value to a second expected value.

26. The computer readable medium of claim 25, being further encoded with computer executable instructions, which when executed by a machine, cause the machine to perform further operations comprising:
   driving a clock signal on a selected one of one or more alternate clock lanes; and
   re-initializing a physical layer connection between the transmitting agent and the receiving agent wherein the selected alternate clock lane is used to transmit a clock signal.

27. The computer readable medium of claim 26 wherein each of the one or more alternate clock lanes is a pre-designated data lane selected from a different data lane division of a plurality of data lane divisions.

28. A system comprising:
   a processor having a plurality of data transmission lanes and at least one clock lane, wherein one or more of the data transmission lanes is designated as an alternate clock lane such that upon a determination of a clock failure, a clock signal is transmitted over one of the one or more designated alternate clock lanes; and
   an agent interconnected to the processor through a point-to-point link-based interconnection scheme, wherein determination of the clock failure is effected by determining that a forwarded clock from the processor to the agent has ceased, evaluating the at least one clock lane, and determining the clock failure if the at least one clock lane is malfunctioning, and if the at least one clock lane is not malfunctioning, evaluating an internal clock circuitry.

29. The system of claim 28 wherein the plurality of data transmission lanes are divided into data transmission lane divisions and each of the one or more data transmission lanes designated as the alternate clock lane is selected from a different data transmission lane division.

30. The system of claim 28 wherein determination of the clock failure is established if the internal clock circuitry is malfunctioning.

* * * * *